Figures 1, 2:
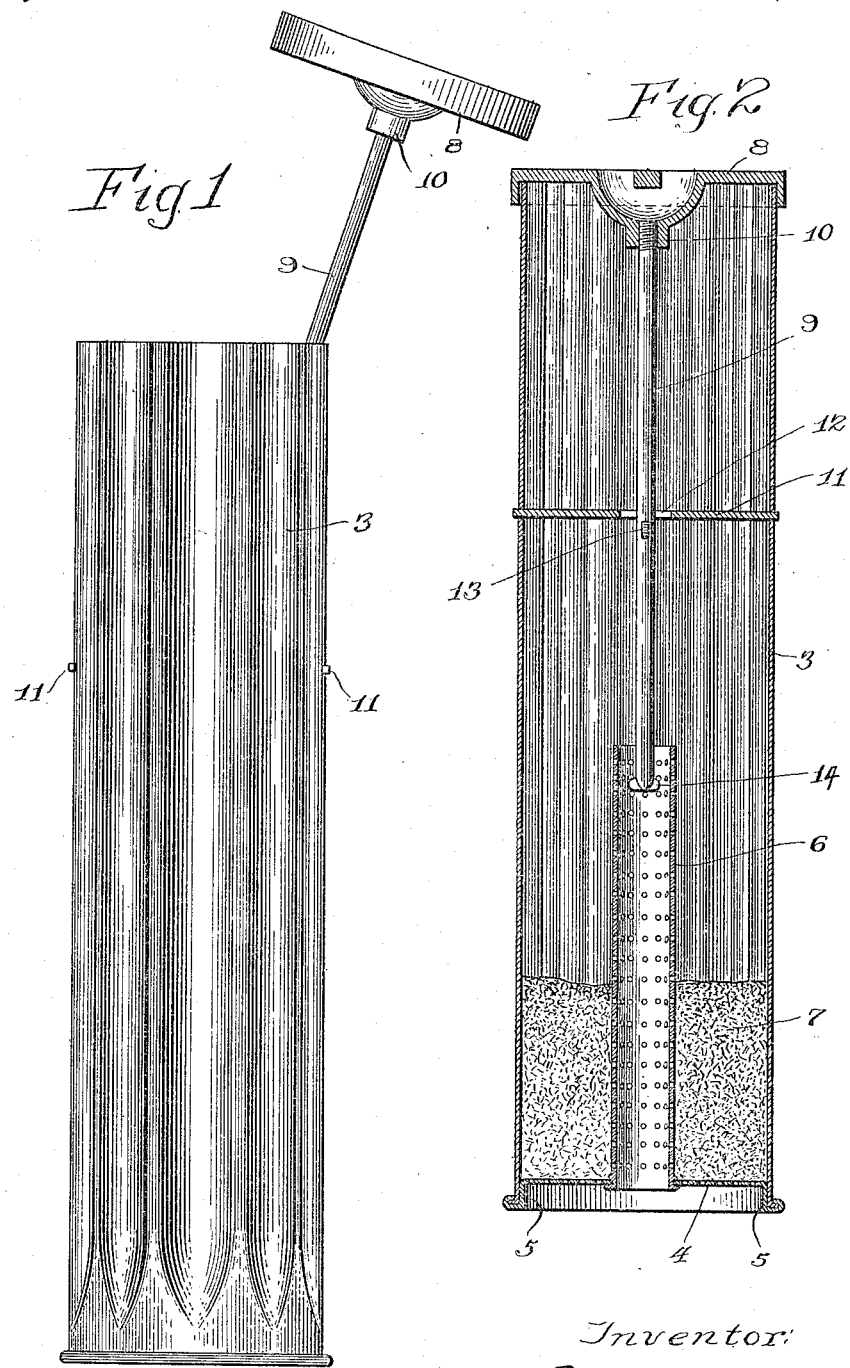

E. A. KANST.
TREE IRRIGATOR.
APPLICATION FILED MAR. 6, 1917.

1,280,486.

Patented Oct. 1, 1918.

Witness
L. B. Graham

Inventor:
Edwin A. Kanst,
by Adams & Jackson,
his Attys.

UNITED STATES PATENT OFFICE.

EDWIN A. KANST, OF CHICAGO, ILLINOIS.

TREE-IRRIGATOR.

1,280,486.     Specification of Letters Patent.     Patented Oct. 1, 1918.

Application filed March 6, 1917. Serial No. 152,831.

*To all whom it may concern:*

Be it known that I, EDWIN A. KANST, a citizen of the United States, and a resident of Chicago, in the county of Cook and State of Illinois, have invented certain new and useful Improvements in Tree-Irrigators, of which the following is a specification, reference being had to the accompanying drawings.

My invention relates to tree irrigators of the general type shown and described in Letters Patent No. 1,194,027, granted to me August 8, 1916, in which the irrigator consists of a tube preferably of corrugated iron suitably galvanized to prevent rusting, said tube being adapted to be buried in the ground adjacent to a tree to be irrigated and being open at the bottom so that water poured into said tube will be fed to the root system of the tree. The irrigator is provided with a cover or cap which closes its open upper end and may be displaced without complete separation from the irrigator, to permit water to be poured into the tube. The object of my present invention is to provide certain improvements in tree irrigators of the type described, by which fertilizer may be stored in it and supplied gradually or from time to time to the soil, as may be desired, and this without interfering with the quick application of a large volume of water to the soil when necessary. I accomplish this object as illustrated in the drawings and as hereinafter described. That which I believe to be new is set forth in the claims.

In the accompanying drawings,—

Figure 1 is a side view of my improved irrigator, showing the cover displaced for the introduction of water or fertilizer; and Fig. 2 is a central vertical section thereof.

Referring to the drawings,—

3 indicates the irrigator tube, which, as above stated, is best made of corrugated galvanized iron and is of suitable length so that when buried in the ground with its upper end substantially flush with the surface thereof, its lower end will extend down into the root system of the tree in connection with which it is used. In practice, a suitable hole is bored by means of a post-hole auger, or similar implement, and the tube 3 inserted in such hole. As best shown in Fig. 2, the upper end of the tube 3 is open and its lower end is partly closed by means of a perforated bottom plate 4 inset a short distance into the lower end of the tube 3 so as to provide a flange 5 around the lower margin of the device. 6 indicates a perforated sleeve, which is mounted, preferably centrally, upon the bottom plate 4 and extends up a suitable distance into the tube 3. In the drawings I have shown said sleeve as extending up to near the longitudinal center of the tube 3, but its height may be varied, and it is of comparatively small diameter so as to provide a considerable space around it within the tube 3, as shown. 7 indicates a mass of fertilizer, which is placed in the lower portion of the tube 3, resting upon the bottom plate 4 and surrounding the sleeve 6. It will be apparent that by pouring water into the tube 3, the fertilizer therein will be moistened and more or less submerged, depending upon the volume of water introduced. If more than enough water is used to saturate the fertilizer, the surplus will flow directly into the soil through the perforations in the upper portion of the sleeve 6, and the balance will percolate through the fertilizer and gradually pass into the soil either through the sleeve 6 or through the bottom plate 4, or both, gradually feeding the fertilizer to the soil. It will be noted that the perforations in the sleeve 6 are disposed throughout the operative length thereof, that is to say, that part of said sleeve which lies below the level to which the device is usually filled with fertilizer, so that the water in the tube 3 below the upper end of said sleeve is not compelled to pass through the entire mass of fertilizer before it can escape to the soil, but has access to said sleeve all along its length. Consequently, the danger of applying too strong a solution of fertilizer to the soil is avoided. Such water as passes to the bottom of the tube 3 may escape directly to the soil through the perforations in the bottom plate 4 without passing through the sleeve 6, and is thus initially distributed over a wider area. By insetting the bottom plate 4 as shown, a small space is provided below the irrigator into which the moisture first passes from the sleeve 6, and as the soil under such space remains comparatively loose, the percolation of the water into the soil is facilitated. By filling the tube 3 with water above the level of the sleeve 6, the water can pass directly into said sleeve through its open upper end as well as through the perforations in the sides thereof, and consequently a large volume of water can be fed to the soil when necessary.

8 indicates a cover-plate, which is adapted to fit upon the upper end of the tube 3, to close the same. Said cover-plate is held against complete separation from the tube by a rod 9, the upper end of which is screwed into a boss 10 at the under side of the cover, as shown in Fig. 2. Said rod passes down through a cross-bar 11 having a narrow slot 12 enlarged at the center to receive the rod 9. Said bar holds the lower portion of the rod 9 in position and guides it as it is moved longitudinally by the raising or lowering of the cover. 13 indicates lugs projecting from diametrically opposite points on the rod 9 at a point which lies immediately below the bar 11 when the cover is in position. These lugs serve to hold the cover on the tube 3 when they are turned at an angle to the slot 12. By rotating the cover to aline said lugs with the slot, it may be lifted into the position shown in Fig. 1, the lugs 13 then passing through said slot. At its lower end the rod 9 carries lugs 14 at right angles to the lugs 13, said lugs being adapted to engage the bar 11 when the cover is raised high enough to prevent complete separation of the cover from the tube 3 unless the cover be again rotated to bring the lugs 14 into alinement with the slot 12. Instead of the lugs 14 a circular head may be employed, as shown and described in my said patent, thereby preventing complete separation of the cover from the tube 3 unless the rod 9 be first disconnected from the cover-plate. By this construction the cover cannot be lost or stolen, and yet may be raised sufficiently to permit water or fertilizer to be supplied to the irrigator. The cover prevents evaporation of the water and also keeps stones, grass clippings and other rubbish out of the irrigator. The irrigator is set in the ground low enough so that the cover-plate does not interfere with the operation of a lawnmower.

That which I claim as my invention, and desire to secure by Letters Patent, is,—

1. A tree irrigator, comprising a tube adapted to be inserted in the ground and having an opening for the introduction of water and fertilizer, a plate in the lower portion of said tube adapted to support a mass of fertilizer, and a sleeve projecting up into the lower portion of said tube through said plate, that portion of said sleeve normally covered by fertilizer being perforated substantially througout its length, whereby a water passage from above the mass of fertilizer to the soil is provided and water may pass through the fertilizer to said sleeve.

2. A tree irrigator, comprising a tube adapted to be inserted in the ground and having an opening for the introduction of water and fertilizer, a sleeve projecting up into the lower portion of said tube, and a perforated plate in the lower portion of said tube around said sleeve, said plate being adapted to support a mass of fertilizer and to permit water to pass to the soil independently of said sleeve.

3. A tree irrigator, comprising a tube adapted to be inserted in the ground and having an opening for the introduction of water and fertilizer, a longitudinally perforated sleeve projecting up into the lower portion of said tube, and a perforated plate in the lower portion of said tube around said sleeve, said plate being adapted to support a mass of fertilizer and to permit water to pass to the soil independently of said sleeve.

4. A tree irrigator, comprising a tube adapted to be inserted in the ground and having an opening for the introduction of water and fertilizer, a sleeve projecting up into the lower portion of said tube, and a bottom plate in the lower portion of said tube around said sleeve and above the lower end of said tube, said bottom plate being perforated to permit water to pass from said tube independently of said sleeve to the space below said bottom plate.

5. A tree irrigator, comprising a tube adapted to be inserted in the ground and having an opening for the introduction of water and fertilizer, a sleeve extending up into the lower portion of said tube, that portion of said sleeve normally covered by fertilizer being perforated substantially throughout its length, and a bottom plate in said tube surrounding said sleeve, said bottom plate being located at a point removed from the lower end of said tube to form a space for the distribution of water.

EDWIN A. KANST.

Copies of this patent may be obtained for five cents each, by addressing the "Commissioner of Patents, Washington, D. C."